United States Patent
Kim (10) Patent No.: US 12,257,701 B1
(45) Date of Patent: Mar. 25, 2025

(54) 7-AXIS MULTI-JOINT ROBOT HAVING HORIZONTAL MOVEMENT ABILITY

(71) Applicant: Yuilrobotics, co. Ltd., Incheon (KR)

(72) Inventor: Dong Heon Kim, Incheon (KR)

(73) Assignee: Yuilrobotics, co., Ltd., Incheon (KR)

( * ) Notice: Subject to any disclaimer, the term of this patent is extended or adjusted under 35 U.S.C. 154(b) by 0 days.

(21) Appl. No.: 18/918,335

(22) Filed: Oct. 17, 2024

(30) Foreign Application Priority Data

May 31, 2024 (KR) .......................... 10-2024-0071276

(51) Int. Cl.
  *B25J 5/02* (2006.01)
  *B25J 9/10* (2006.01)
  *B25J 19/00* (2006.01)

(52) U.S. Cl.
  CPC ............... *B25J 19/002* (2013.01); *B25J 5/02* (2013.01); *B25J 9/1005* (2013.01)

(58) Field of Classification Search
  CPC .......... B25J 5/02; B25J 9/1005; B25J 19/002; G05B 2219/40252; G05B 2219/40272
  See application file for complete search history.

(56) References Cited

U.S. PATENT DOCUMENTS

| | | | | |
|---|---|---|---|---|
| 4,954,043 A * | 9/1990 | Yoshida | ............... | B25J 19/0016 414/719 |
| 5,779,830 A * | 7/1998 | Wakefield | ........... | B29C 66/4722 156/577 |
| 5,901,613 A * | 5/1999 | Forslund | .................. | B25J 9/046 901/23 |
| 6,145,403 A * | 11/2000 | Aschenbrenner | .... | B25J 19/0008 361/144 |
| 2003/0106390 A1 * | 6/2003 | Bohlken | ............... | B25J 19/0012 74/490.01 |
| 2010/0154579 A1 * | 6/2010 | Nakamura | ........... | B25J 19/0054 74/490.05 |
| 2010/0319164 A1 * | 12/2010 | Bax | ....................... | B25J 19/0016 16/401 |
| 2020/0269429 A1 * | 8/2020 | Chavez | ................ | B25J 15/0616 |

* cited by examiner

*Primary Examiner* — Dale Moyer (57) ABSTRACT

The present invention provides a horizontally movable 7-axis multi-joint robot, including: a robot arm to which a plurality of arm units is coupled through multi-joints; a transport member, which is movable along a guide rail installed in a horizontal direction wherein the robot arm is coupled thereto; a base seated on the transport member, to which the robot arm is coupled; and a weight balancing arm prepared such that any one of the above arm units is eccentrical on the base, which has a weight pendulum prepared in opposite to the robot arm, thereby preventing the weight from being concentrated toward the robot arm.

10 Claims, 9 Drawing Sheets

7-AXIS MULTI-JOINT ROBOT HAVING HORIZONTAL MOVEMENT ABILITY

CROSS-REFERENCE TO RELATED APPLICATION

This application claims priority to and the benefit of Korean Patent Application No. 2024-0071276, filed on May 31, 2024, the disclosure of which is incorporated herein by reference in its entirety.

BACKGROUND OF THE INVENTION

1. Field of the Invention

The present invention relates to a multi-axis multi-joint robot, more particularly, a 7-axis multi-joint robot which is able to move in a horizontal direction.

2. Description of the Related Art

Generally, a robot is a machine that automatically treats given tasks or operates with its own ability, and is used in very diverse fields of application including industrial, medical, space and undersea uses, or the like.

In recent years, factory automation facilities are provided and high-speed and mass production systems have been prepared, therefore, a multi-joint robot to execute various motions is utilized for a wide variety of purposes.

Such a multi-joint robot moves up and down (that is, vertically) and/or reciprocates in right and left directions around multiple axes (for example, 5-axes, 6-axes, 7-axes, etc.), so as to have a degree of freedom that enables movement in any random direction or toward any random point.

Conventionally, the multi-joint robot is generally fixed and installed at any position and, in this case, causes a problem of rather deteriorating availability of the multi-joint robot. Therefore, it is now required to propose technologies necessary to overcome the above problem.

PRIOR ART LITERATURE

Patent Literature (Patent Document 1) KR 10-2024-0048245 A
(Patent Document 2) KR 10-2024-0033504 A
(Patent Document 3) KR 10-2023-0031533 A
(Patent Document 4) KR 20-0495567 Y1

SUMMARY OF THE INVENTION

Therefore, the present invention has been made to overcome the afore-mentioned problems, and it is an object of the present invention to provide a multi-joint robot, which is movable in a horizontal direction along a guide rail such that it can improve availability of the multi-joint robot or extend applications thereof, wherein it relieves the stress applied to the guide rail.

In order to achieve the above object, the present invention provides a horizontally movable 7-axis multi-joint robot, including: a robot arm having a plurality of arm units coupled by multi-joints; a transport member that is movable along a guide rail installed in a horizontal direction; a base seated on the transport member, to which the robot arm is coupled; and a weight balancing arm which is prepared to make any one of the arm units to be eccentrical on the base, and is provided with a weight pendulum present in opposite to the robot arm so that the weight is not concentrated to the robot arm.

According to an embodiment, the weight balancing arm may include: a rail extending in an outer direction on the base; and a coupling arm which is prepared to be movable along a drive rail provided in parallel with the rail by driving a drive device, and is able to couple with the weight pendulum seated on the rail.

According to an embodiment, the present invention may further include a control unit to move the coupling arm coupled to the weight pendulum, on the basis of a projection point to project an end portion of the robot arm in a horizontal plane and a distance between the arm units on the base.

According to an embodiment, the control unit may move the coupling arm coupled to the weight pendulum along the rail, on the basis of the distance, the weight of the weight pendulum on the rail and the weight of a subject coupled to the end portion of the robot arm.

According to an embodiment, the coupling arm may include a magnetic member prepared to be couplable to the weight pendulum seated on the rail by magnetic force.

According to an embodiment, the magnetic member is an electromagnet to form magnetic force by application of power supply to one side thereof, and may include a power terminal at the one side, which is prepared to be electrically connected to one side of the weight pendulum.

According to an embodiment, the weight pendulum may include: an inlet port prepared at one side thereof, which is prepared to be electrically connected to the power terminal; and an outlet port prepared on the other side in order to transfer the power applied through the inlet port to another weight pendulum.

According to an embodiment, the weight pendulum may include an electromagnet that forms magnetic force to the other side of the weight pendulum using the power applied through the inlet port.

According to an embodiment, the present invention may further include a stopper fixed at any site of the rail to interrupt the movement of the weight pendulum.

According to an embodiment, the control unit may move the coupling arm maximally in the outer direction of the rail and, when the movement of the coupling arm is interrupted during the movement of the coupling arm, set a corresponding site as a maximum movable point. Then, by subtracting a distance between 0 point and the maximum movable point from a length of the rail and dividing the resulting value by a thickness of the weight pendulum, the control unit may calculate the number of the weight pendulums seated on the rail or a total weight thereof.

According to one embodiment of the present invention, it is possible to improve availability of a multi-joint robot or extend applications thereof by moving the multi-joint robot along a guide rail completed as described above. In this case, when coupling the multi-joint robot to a subject having load such as gripping the subject, distortion stress or the like applied to the guide rail can be relieved.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "part" for the components used in the following description are given or mixed in consideration of only the ease of writing the specification, however, do not have distinct meanings or roles by themselves. Further, in describing the embodiments disclosed in the present specification, if it is determined that detailed descriptions of related known technologies may obscure the gist of the embodiments disclosed in this specification, the detailed description thereof will be omitted. Further, the accompanying drawings are only for easy understanding of the embodiments disclosed in the present specification, and the technical idea disclosed herein is not limited by the accompanying drawings, and all changes included in the spirit and scope of the present invention should be understood to include equivalents or substitutes.

When an element is referred to as being "coupled" or "connected" to another element, it is understood that it may be directly coupled or connected to the other element, but other elements may also exist therebetween. On the other hand, when it is said that a certain element is "directly coupled" or "directly connected" to another element, it should be understood that other elements do not exist therebetween.

The singular expression includes the plural expression unless the context clearly dictates otherwise.

In this specification, terms such as "include . . . " or "have . . . " are intended to designate that the features, numbers, steps, operations, components, parts, or combinations thereof described in the specification exist, but it should be understood that it does not preclude the existence or addition of one or more other features, numbers, steps, operations, components, parts, or combinations thereof.

Figure 1:
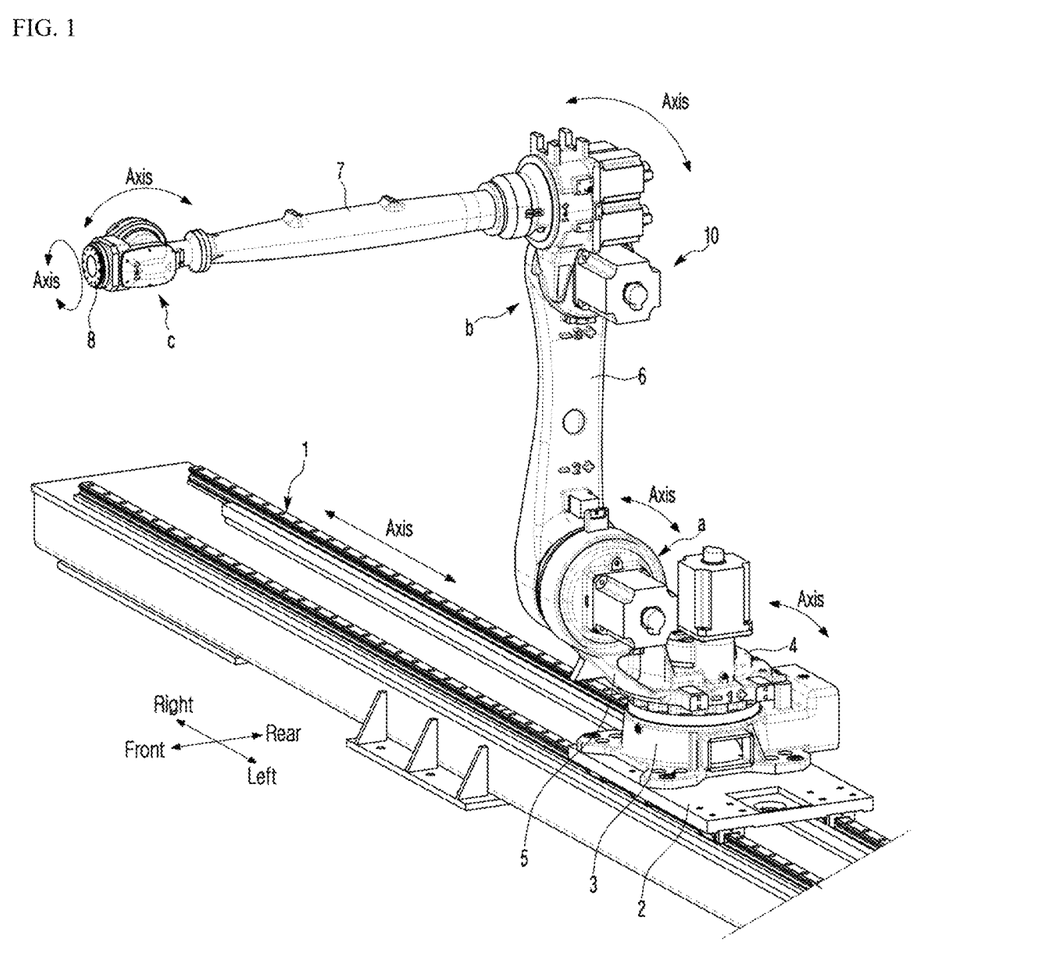
FIG. 1 illustrates an appearance of the multi-joint according to an embodiment of the present invention.
Figure 2:
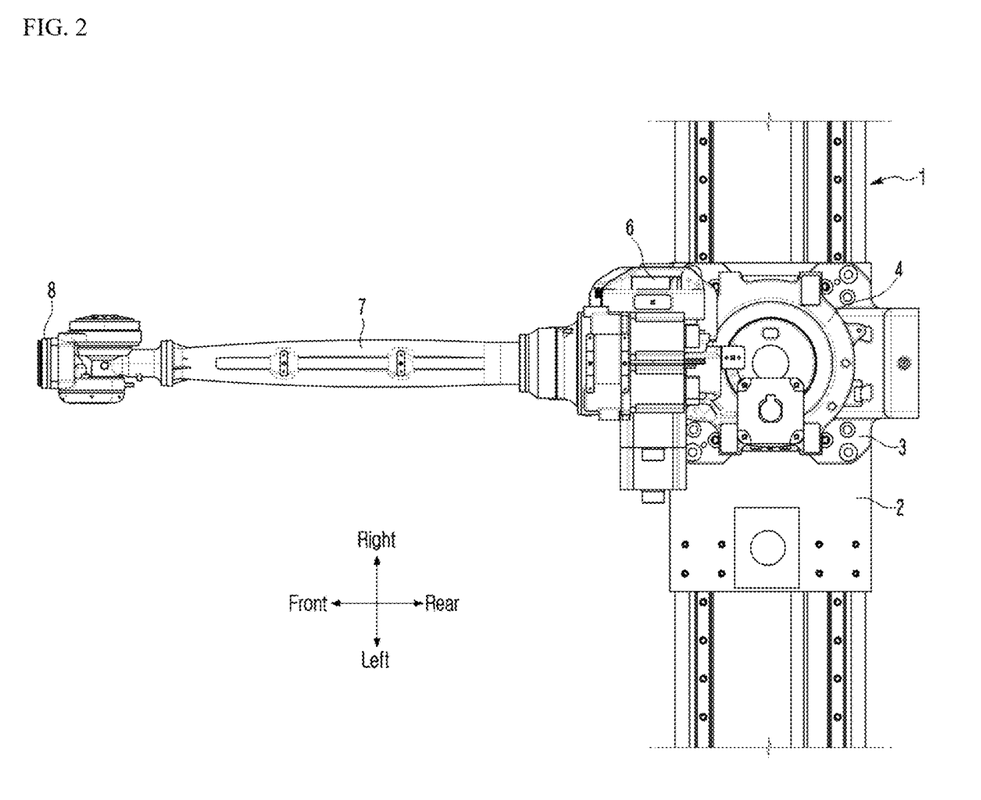
FIG. 2 is a top view of the multi-joint robot shown in FIG. 1.

FIG. 1 illustrates an appearance of the multi-joint according to an embodiment of the present invention; and FIG. 2 is a top view of the multi-joint robot shown in FIG. 1.

As shown in FIGS. 1 and 2, the multi-joint robot according to an embodiment of the present invention may include a robot arm to which a plurality of arm units (5-7) is coupled through multi-joints (a-c), wherein the robot arm 10 is able to move along a guide rail 1 installed in any one direction on a horizontal plane, and may further include a transport member 2 coupled to the robot arm for the above purpose.

That is, the multi-joint robot arm 10 coupled to the transport member 2 is able to move in a straight direction along the guide rail 1, thereby overcoming a problem of deterioration in terms of availability or applications of the multi-joint robot since the robot arm 10 is fixed and mounted on any one site.

The transport member 2 coupled such that it can move along the guide rail 1 may approximately have a plane shape coupled to the guide rail 1, and may also be provided with a base (3, 4) to which the robot arm 10 is coupled.

The base (3, 4) may include a bottom base 4 coupled to the transport member 2 and a top base 3 prepared to be rotatable around a vertical axis by a bearing or the like. That is, the top base 4 may be coupled on the bottom base 4 in a laminate structure in order to be rotatable about a vertical center axis, wherein the robot arm 10 is coupled on the top base 3 and thus may reciprocate in a clockwise or counter-clockwise direction around the vertical axis.

The robot arm 10 coupled to the top base 3 may be provided with a first arm unit 5 which is fixed and coupled thereto, wherein the first arm unit 5 and the second arm unit 6 may be axially coupled around a horizontal axis via 'a-joint' as a medium, the second arm unit 6 and the third arm unit 7 may be axially coupled around the horizontal axis via 'b-joint' as a medium, while the third arm unit 7 and an end terminal 8 may be axially coupled around the horizontal axis via 'c-joint' as a medium.

Accordingly, the second and third arm units, and the end terminals (6-8) may reciprocate in up and down directions (that is, vertically) around a horizontal axis, respectively. Further, the first arm unit 5 coupled with the above components is fixed on the top base 4, wherein it reciprocates in right and left directions around a vertical axis. Therefore, the multi-joint robot arm 10 can have a degree of freedom that the arm is able to move in any random direction or to any site.

Of course, as described above, the robot arm 10 working as above may be coupled to the transport member 2 and drive along the guide rail 1 in the horizontal direction.

FIGS. 1 and 2 illustrated that the transport member 2 coupled with the robot arm 10 is prepared above the guide rail 1, however, the present invention is not particularly limited the above configuration but, according to another embodiment, the transport member 2 is coupled to the bottom of the guide rail to be suspended therefrom so that the robot arm 10 may be installed downward.

Meanwhile, the multi-joint robot according to an embodiment of the present invention may include a control unit as a means for controlling overall motions of the multi-joint robot.

The control unit may execute various applicable programs in communication with separate components of the multi-joint robot, and enable performance of related motions. That is, the control unit may treat signals or data input/output through the components of the multi-joint robot, otherwise, drive an applicable program stored in a storage member, thereby controlling the driving of the multi-joint robot.

According to a specific embodiment, the control unit may control the motion of the multi-joint robot according to a preset sequence comprising predetermined steps stored in the storage member. Herein, each step may include a position, direction and posture, etc. of an end terminal 8 as an end portion of the robot arm on an internal space. Further, the control unit may control a movement of the transport member 2, therefore, the robot arm 10 coupled to the transport member 2 may straightly move along the guide rail.

On the other hand, as shown in FIG. 2, the first arm unit 5 is coupled to the base (3, 4), specifically, on the top base 4 to stand in an upper direction, wherein a position of the first arm unit 5 on the top base 4 may be combined in an eccentric position which is biased in any one direction from the center of the top base 4.

Since the robot arm 10 or first arm unit 5 prepared on the transport member 2 coupled to the guide rail 1 described above, specifically, on the top base 4 is coupled on the eccentric position, as shown in FIGS. 1 and 2, distortion stress may be applied to the guide rail 1 in such a case where the first to third arm units (5-7) are postured in a direction crossing a length direction of the guide rail 1, or the like. If the robot arm 10 is coupled or gripped with a subject having a predetermined weight at an end terminal 8 thereof, a dimension of the stress applied to the guide rail 1 may further be increased, which may occur a problem of deteriorating durability of the guide rail 1.

In order to overcome such problems, the base (3, 4), particularly, the top base 4 according to an embodiment of the present invention may be coupled with a weight balancing arm 20 having weight pendulums (31, 32) in an opposite direction of the robot arm 10 so as to prevent the weight to be concentrated toward the eccentrically coupled robot arm 10. Of course, since the weight balancing arm 20 is coupled to the top base 4, the weight balancing arm 20 may also reciprocate around the center of the top base 4 in line with reciprocating the top base 4.

Figure 4:
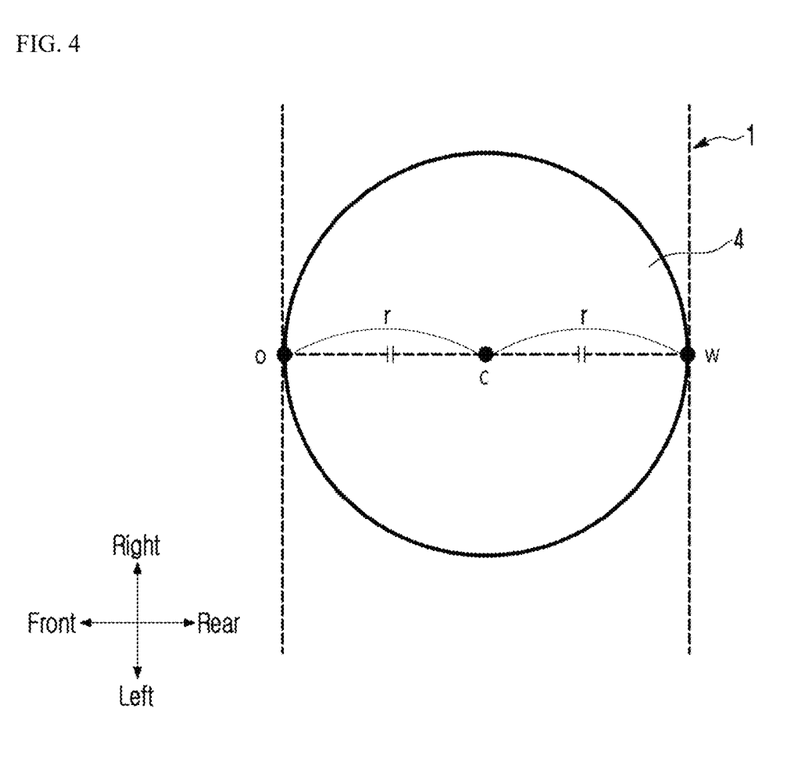
FIG. 4 is a view schematically illustrating positions of a robot arm and a weight pendulum on a base according to an embodiment of the present invention.

FIG. 4 schematically illustrate the positions of the robot arm and the weight pendulum on the base according to an embodiment of the present invention. As shown in FIG. 4, when the center of the base (3, 4), specifically, when the top base 4 rotational axis of the top base 4 rotating on the bottom base 3 is 'c' point, the robot arm 20 is eccentrical on one side of the base (3, 4), specifically, the top base 4 and thus may be located on 'o' point. In order to relieve the stress applied to the guide rail 1 due to such eccentrically positioned robot arm 10, the weight pendulum (31, 32) may be prepared at 'w' point, which is a position spaced by the same distance (r) in the opposite direction of the position (o point) of the robot arm 10 with reference to the c point. The position of w point is not particularly limited but may also be located on the top base 4.

In other words, it is preferable that the robot arm 10 and the weight pendulum (31, 32) spaced by the same distance (r) with reference to the center c on the base (3, 4), particularly, the top base 4 are disposed in opposite directions.

As described below, according to an embodiment of the present invention, the weight pendulum (31, 32) positioned on the rail 21 of the weight balancing arm 20 may move according to the movement of the coupling arm 23, wherein w point refers to 0 point position of the movable weight pendulum (31, 32).

Meanwhile, the end portion, that is, the end terminal 8 of the robot arm 10 according to an embodiment of the present invention may vary in the distance from the center c of the base (3, 4) depending on motions of the first to third arm units (5-7). Further, since a weight of the subject gripped or coupled to the end terminal 8 may vary according to tasks to be conducted, the weight balancing arm 20 according to an embodiment of the present invention may be implemented such that the weight pendulum (31, 32) can be moved from the center c of the base 34 to the outer direction.

Figure 5:
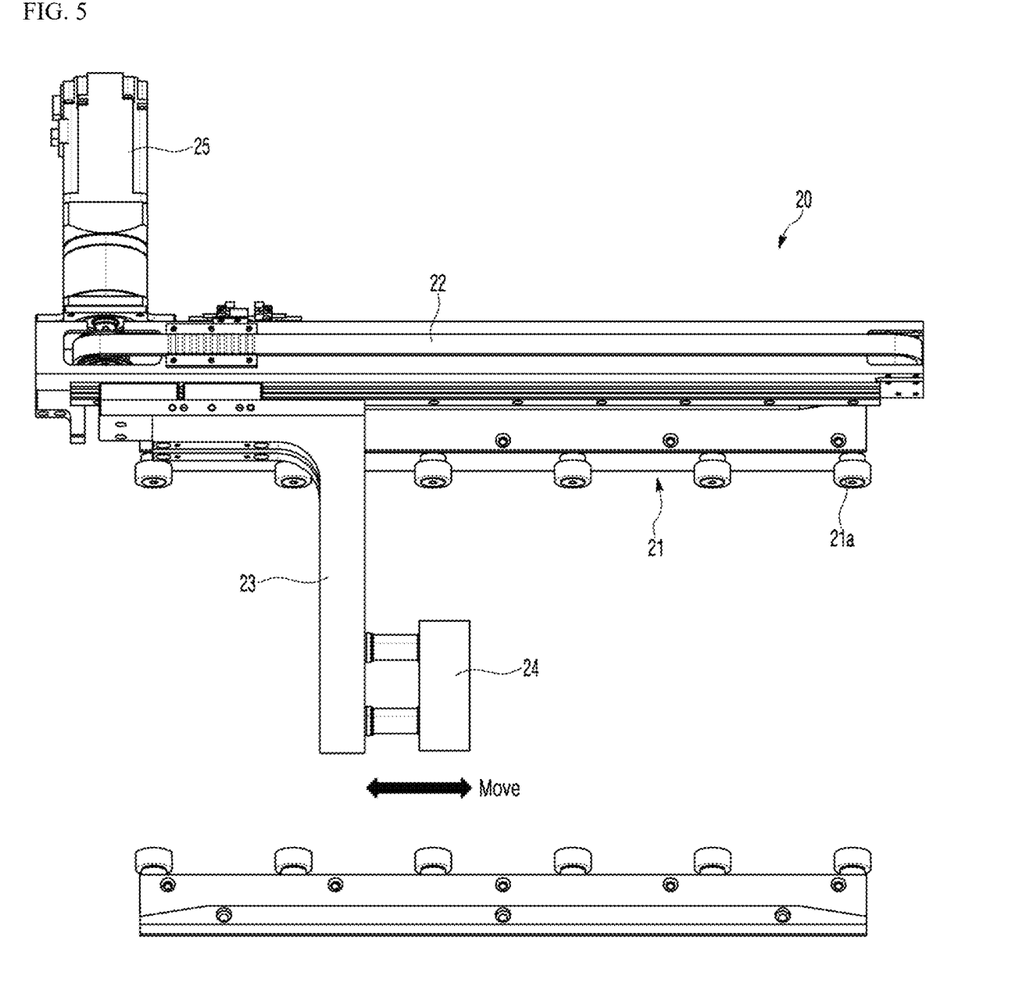
FIG. 5 illustrates a weight balancing arm according to an embodiment of the present invention.

FIG. 5 illustrates a weight balancing arm according to an embodiment of the present invention. As shown in FIG. 5, the weight balancing arm 20 according to an embodiment of the present invention may include: a rail 21 extending lengthwise in a horizontal and straight direction; a drive rail 22 prepared in parallel to the rail 21; and a coupling arm 23, which is movable along the drive rail 22 by the driving of a drive device 25 and can be coupled to the weight pendulum (31, 32) seated on the rail 21.

A pair of rails 21 is coupled to the base (3, 4), particularly, the top base 4 at its inner end, and may extend from the center c of the base (3, 4) in an outer direction opposed to the robot arm 10. For example, the rail 21 may extend lengthwise an outer direction with reference to w point shown in FIG. 4, that is, in a straight direction connecting o point and c point.

The rail 21 is provided with a plurality of rail wheels 21a that is rotatable in a length direction, so that frictional force is preferably reduced when the weight pendulum (31, 32) seated on the rail wheel 21a is moving.

Further, as described above, the weight balancing arm 20 may further include a drive device 25, and a coupling arm 23 prepared to be movable along the drive rail 22 by the driving of the drive device 25.

The drive rail 22 may be prepared in parallel to the rail 21 along the rail 21 on the top portion adjacent to any one of the pair of rails 21, wherein the coupling arm 23 is coupled to the drive rail 22 and an end portion of the coupling arm 23 may be extend lengthwise to be positioned between the pair of rails 21.

The coupling arm 23 is a component to be coupled to the weight pendulum (31, 32) or to grip the same, and may include a magnetic member 24 attachable to the weight pendulum (31, 32) by magnetic force, wherein the magnetic member 24 may be prepared to direct the outer direction of the base (3, 4) at the end portion of the coupling arm 23.

In this regard, according to a preferred embodiment, the magnetic member 24 may be an electromagnet to form the magnetic force by application of power supply. Accordingly, the control unit according to an embodiment of the present invention may apply power supply to the magnetic member 24 to form magnetic force so that the weight pendulum (31, 32) can be attached to the coupling arm 23. On the contrary, blocking the applied power supply of the magnetic member 24 may allow the weight pendulum (31, 32) to be detached from the coupling arm 23.

Therefore, the control unit according to an embodiment of the present invention may move the coupling arm 23 along the drive rail 22 while attaching the weight pendulum (31, 32) to the coupling arm 23 using the magnetic member 24, whereby the weight pendulum (31, 32) on the rail 21 can move in inner/outer directions with reference to a position of the base (3, 4).

As described above, a spacing distance between any one point on the base (3, 4) and the end portion, that is, the end terminal 8 of the robot arm 10 may vary depending on motions of the first to third arm units (5-7), therefore, the control unit may move the coupling arm 23 coupled to the weight pendulum (31, 32) along the drive rail 22 based on the spacing distance.

According to a specific embodiment, the control unit may use a length and an angle of the first arm unit 5 coupled on the top base 4 in an upper direction, a length of the second arm unit 6 and an angle between the second arm unit 6 and the first arm unit 5, and a length of the third arm unit 7 and an angle between the third arm unit 7 and the second arm unit 6, so as to calculate a spacing distance Dp between a projection point p to project the end terminal 8 prepared at the end portion of the third arm unit 7 on a horizontal plane and a site at which the first arm unit 5 is coupled on the top base 4.

Figure 3:
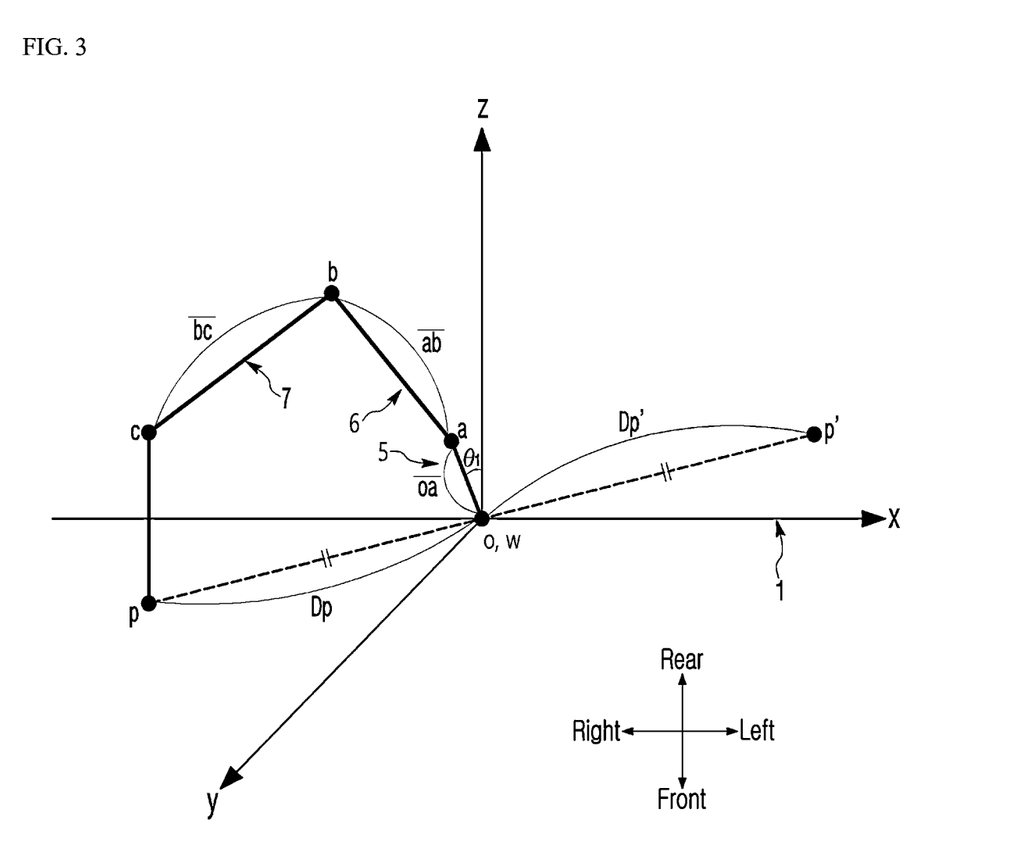
FIG. 3 is a view for explaining a method for determining a moving distance of a weight pendulum in a weight balancing arm according to an embodiment of the present invention.

In other words, as shown in FIG. 3, the control unit may use lengths (oa, ab, bc) of preset first to third arm units (5-7); a set angle (01) of the first arm unit 5, which is fixed on the top base 4, to a vertical axis; an angle between the first arm unit 5 and the second arm unit 6 calculated based on a revolution amount of the drive device prepared on each joint (a and b joints); and an angle between the second arm unit 6 and the third arm unit 7, so as to calculate a spacing distance Dp between the top base 4 and the projection point p through trigonometric function.

The control unit may space the weight pendulum (31, 32) by a distance Dp' corresponding to the calculated spacing distance Dp and, when the weight pendulum (31, 32) corresponding to a weight of a subject coupled or gripped to the end terminal 8 of the robot arm 10 is present on the rail 21 of the weight balancing arm 20, the control unit may use the coupling arm 23 to move the weight pendulum (31, 32) by Dp' from the w point (or 0 point). Of course, o point and w point are spaced therebetween by r×2, as shown FIG. 4.

Further, since a weight of the subject to be coupled or gripped at the end terminal 8 of the robot arm 10 may vary, the control unit may differently set a moving distance of the coupling arm 23 depending on the weight of the subject and/or a weight of the weight pendulum (31, 32).

According to a specific embodiment, the control unit may control movement of the coupling art 23 such that a value obtained by multiplying the weight of the subject coupled or gripped at the end terminal 8 of the robot arm 10 by the spacing distance Dp from the top base 4 to the subject is the same as a value obtained by multiplying the weight of the weight pendulum (31, 32) of the weight balancing arm 20 by a spacing distance (or moving distance) Dp' of the weight pendulum (31, 32) from the w point (or 0 point).

Figure 6:
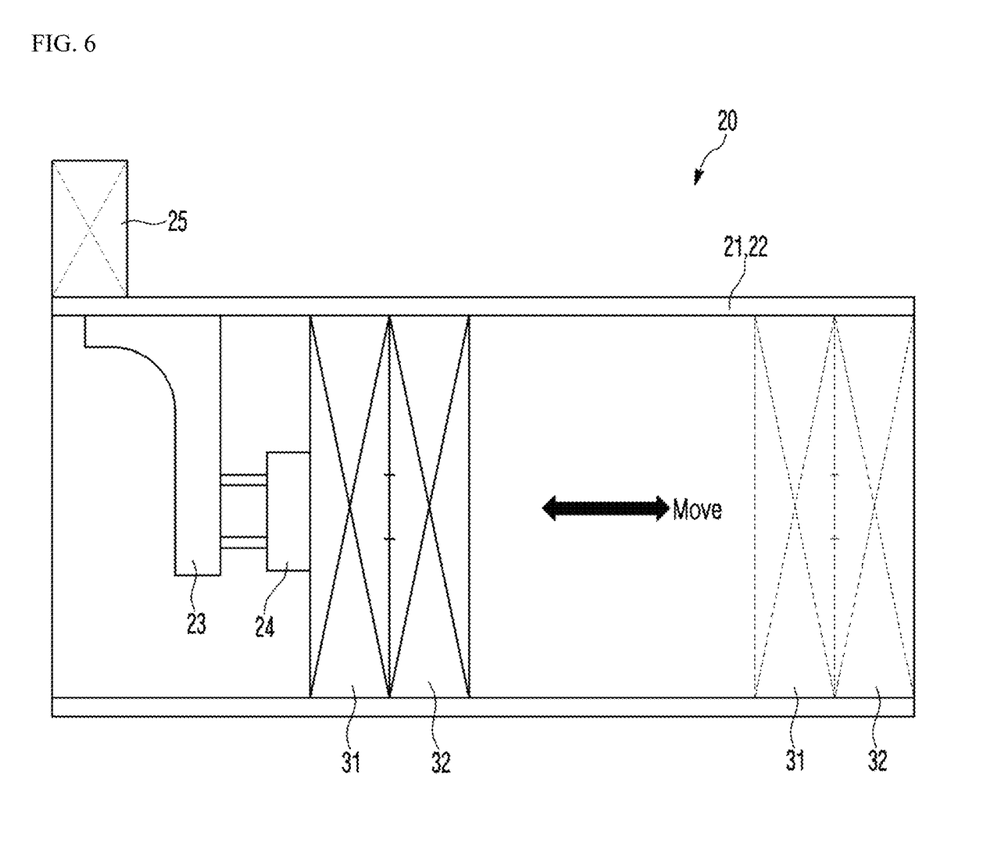
FIG. 6 is a schematic view of the weight balancing arm shown in FIG. 5.

Meanwhile, as shown in FIG. 6, according to an embodiment of the present invention, a plurality of weight pendulums (31, 32) may be coupled to each other on the rail 21 of the weight balancing arm 20. Further, as required, the worker may control a weight of whole weight pendulums (31, 32) by adding or subtracting the number of the weight pendulums (31, 32).

The coupling between the plurality of weight pendulums (31, 32) may be performed by a predetermined coupling means, however, the weight pendulums (31, 32) according to an embodiment of the present invention is preferably attachable/detachable by magnetic force, preferably, the magnetic force of an electromagnet.

That is, each weight pendulum (31, 32) forms magnetic force to one surface thereof when applying power supply from the outside and thus may be attached to another weight pendulum (31, 32). On the contrary, when the applied power supply is cut off, the weigh pendulum is preferably detachable from another weight pendulum (31, 32).

Therefore, the one surface of the weight pendulum (31, 32) may form magnetic force when power supply is applied from the outside, while the other surface opposite to the above surface may be provided with a steel plate (not shown) which is attachable to another weight pendulum (31, 32) by magnetic force.

Figure 7:
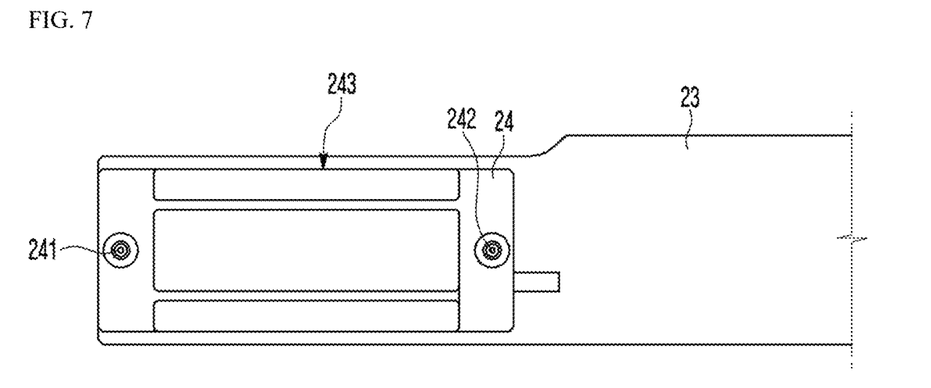
FIG. 7 illustrates a magnetic member according to an embodiment of the present invention.

FIG. 7 illustrates a magnetic member according to an embodiment of the present invention. As shown in FIG. 7, the magnetic member 24 according to an embodiment of the present invention may have magnetic force formed on one surface thereof wherein the corresponding surface having magnetic force formed thereon may be provided with a magnet surface 243.

At this time, the surface of the magnetic member 24 on which the magnet surface 243 is provided may be provided with a pair of power terminals (241, 242) in order to apply the applied power supply to the magnetic member 24 to the weight pendulum (31, 32). Types of the power terminals (241, 242) are not particularly limited in the present invention, however, pogo-pin type may be used.

Figure 8:
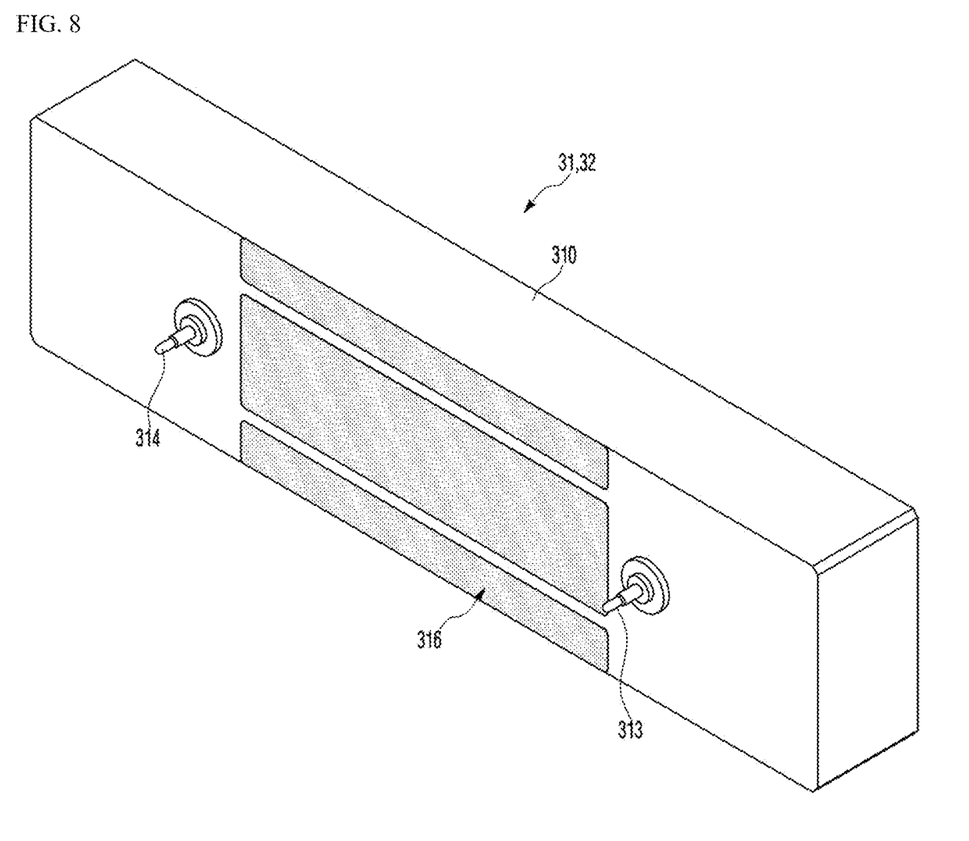
FIG. 8 illustrates a weight pendulum according to an embodiment of the present invention.

Corresponding to a position of the power terminal (241, 242) of the magnetic member 24, a pair of inlet ports (not shown) may be provided on one surface of the weight pendulum (31, 32) having a predetermined weight.

The inlet port is a terminal to establish electrical connection with the power terminals (241, 242) of the magnetic member 24, wherein the coupling arm 23 moves along the drive rail 22 by the above inlet port and, when the magnetic member contacts one surface of the weight pendulum (31, 32), the magnetic member 24 can not only be attached to the weight pendulum (31, 32), but also the power terminal (241, 242) of the magnetic member 24 may be electrically connected to the inlet port of the weight pendulum (31, 32).

With the power supply applied through the inlet port present in one surface of the weight pendulum (31, 32), the corresponding weight pendulum (31, 32) may form magnetic force on the other surface. When applying the power supply through the magnetic member 24, the corresponding weight pendulum (31, 32) may form magnetic force on the other surface so that it can be attached to another weight pendulum (31, 32).

The weight pendulum (31, 32) according to a preferred embodiment of the present invention may include a pair of outlet ports (313, 314) provided on the other surface on which magnetic force is formed, so as to transfer the power supply applied from the outside to another weight pendulum (31, 32). Types of the outlet ports (313, 314) are not particularly limited in the present invention, however, pogo-pin type may be used.

The outlet port (313, 314) may be electrically connected to the inlet port, and may transfer and apply power to another weight pendulum (31, 32) through the outlet port (313, 314) using the power supply applied from the outside through the inlet port.

Therefore, another weight pendulum (31, 32) adjacent to the weight pendulum (31, 32) contacting the magnetic member 24 may also form magnetic force on the other surface, in addition, may be electrically connected to an inlet port of an additional weight pendulum (31, 32).

Meanwhile, on the rail 21 of the weight balancing arm 20, a plurality of weight pendulums (31, 32) may be arranged in a row.

The control unit cannot recognize the additional number of weight pendulums (31, 32) on the rail 21 and, when the control unit moves the coupling arm 23 in the outer direction under a state of not recognizing the number of weight pendulums (31, 32), there is a problem that the weight pendulum (31, 32) may get rid of the rail 21.

In order to solve such a problem as described above, the rail 21 according to an embodiment of the present invention may further include a stopper (not shown), which is fixed on any site and interrupts the weight pendulum (31, 32) from moving in the outer direction.

The stopper may be fixed on an outer end portion of the rail 21, however, it is preferable that the stopper is slidingly movable or detachable to be possibly coupled to any site of the rail 21.

Figure 9:
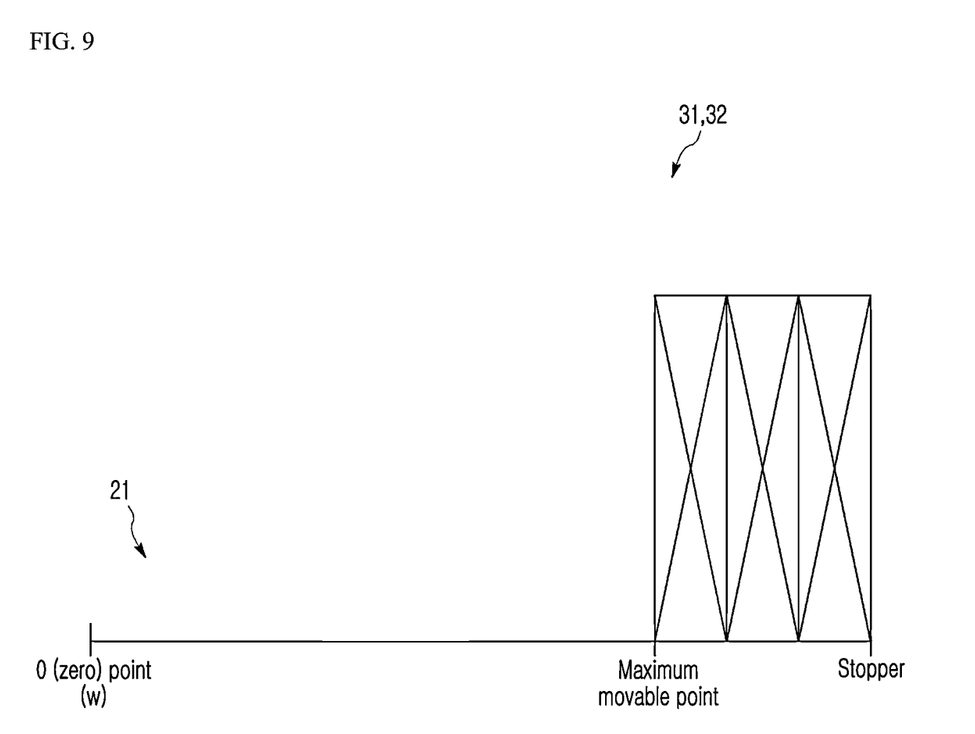
FIG. 9 is a view for explaining a method of calculating the number of weight pendulums seated on a rail according to an embodiment of the present invention.

The control unit according to an embodiment of the present invention may maximally move the coupling arm 23 in the outer direction. At this time, it can be determined that movement was interrupted by the stopper using a revolution rate or drive power (current or voltage, etc.) of the drive device 25 during movement of the coupling arm 23. In this case, as shown in FIG. 9, the control unit may set a site, at which the movement is interrupted, as a maximum movable point and then may calculate the number of weight pendulums (31, 32) seated on the rail 21 by subtracting a distance from 0 point to the maximum movable point from a whole length of the rail 21 then by dividing the resulting value by the set thickness of the weight pendulum (31, 32). Further, an overall weight of the weight pendulums (31, 32) seated on the rail 21 may also be calculated.

Thereafter, as described above, the control unit may calculate the moving distance Dp' of the coupling arm 10 based on the overall weight of the weight pendulums (31, 32) seated on the rail 21, the distance from the top base 4 to the projection point p, and the weight of the subject coupled or gripped to the end terminal 8 of the robot arm 10.

As such, preferred embodiments of the present invention have been described in detail with reference to the accompanying drawings. The detailed description of the present invention is for illustrative purposes and those skilled in the art to which the present invention pertains would understand that the present invention could be easily modified into other specific forms without altering technical idea or necessary features of the present invention.

Accordingly, the scope of the present invention is represented by the appended claims described below rather than the detailed description, it should be construed that all alterations or modified forms deduced from the meanings, range and equivalent concepts in the claims are included in the range of the present invention.

| Description of reference numerals | |
|---|---|
| 1: Guide rail | 2: Transport member |
| 3: Bottom base | 4: Top base |
| 5: First arm unit | 6: Second arm unit |
| 7: Third arm unit | 8: End terminal |
| a, b, c: Joint | 10: Robot arm |
| 20: Weight balancing arm | 21: Rail |
| 21a: Rail wheel | 22: Drive rail |
| 23: Coupling arm | 24: Magnetic member |
| 241, 242: Power terminal | 243: Magnet surface |
| 25: Drive device | 31, 32: Weight pendulum |
| 313, 314: Outlet port | 316: Magnet surface |

What is claimed is:

1. A horizontally movable 7-axis multi-joint robot, comprising:
    a robot arm to which a plurality of arm units is coupled through multi-joints;
    a transport member, which is movable along a guide rail installed in a horizontal direction wherein the robot arm is coupled thereto;
    a base seated on the transport member, to which the robot arm is coupled; and
    a weight balancing arm prepared such that any one of the above arm units is eccentrical on the base, which has a weight pendulum prepared in opposite to the robot arm, thereby preventing the weight from being concentrated toward the robot arm.

2. The multi-joint robot according to claim 1, wherein the weight balancing arm includes:
    a rail extending in an outer direction on the base; and
    a coupling arm prepared to be movable along a drive rail, which is prepared in parallel to the rail, by the driving of a drive device, wherein the coupling arm is able to be coupled with the weight pendulum seated on the rail.

3. The multi-joint robot according to claim 2, further comprising:
    a control unit that moves the coupling arm coupled with the weight pendulum along the rail, on the basis of a projection point to project an end portion of the robot arm to a horizontal plane and a spacing distance between the arm units on the base.

4. The multi-joint robot according to claim 3, wherein the control unit moves the coupling arm coupled with the weight pendulum along the rail, on the basis of the spacing distance, a weight of the weight pendulum on the rail, and a weight of the subject coupled to the end portion of the robot arm.

5. The multi-joint robot according to claim 3, further comprising a stopper fixed on any site of the rail to interrupt movement of the weight pendulum,
    wherein the control unit moves the coupling arm maximally in the outer direction of the rail, and then, when the movement of the coupling arm is interrupted during the movement of the coupling arm, sets a corresponding site as a maximum movable point; and
    by subtracting a distance between 0 point and the maximum movable point from a length of the rail and then dividing the resulting value by a thickness of the weight pendulum, the control unit calculates the number of the weight pendulums seated on the rail or a total weight thereof.

6. The multi-joint robot according to claim 2, wherein the coupling arm includes a magnetic member, which is prepared to be coupled to the weight pendulum seated on the rail by magnetic force.

7. The multi-joint robot according to claim 6, wherein the magnetic member is an electromagnet to form magnetic force on one surface thereof by application of power supply, and includes a power terminal provided on the one surface such that it can be electrically connected to one surface of the weight pendulum.

8. The multi-joint robot according to claim 7, wherein the weight pendulum includes: an inlet port prepared to be electrically connectable to the power terminal on one surface thereof; and an outlet port prepared on the other surface in order to transfer the power supply applied through the inlet port to another weight pendulum.

9. The multi-joint robot according to claim 8, wherein the weight pendulum includes an electromagnet to form magnetic force on the other surface of the weight pendulum using the power supply applied through the inlet port.

10. The multi-joint robot according to claim 2, further comprising a stopper fixed on any site of the rail to interrupt movement of the weight pendulum.

* * * * *